United States Patent
Seki et al.

(10) Patent No.: US 7,028,110 B2
(45) Date of Patent: Apr. 11, 2006

(54) COMPUTER AND COMPUTER SYSTEM HAVING SECURITY FEATURES

(75) Inventors: Fujio Seki, Shinagawa (JP); Takashi Sato, Shinagawa (JP); Yasuyuki Kuno, Kawasaki (JP); Hirofumi Kashiwara, Kawasaki (JP)

(73) Assignees: Fujitsu Component Limited, Tokyo (JP); Fujitsu Limited, Kawasaki (JP)

( * ) Notice: Subject to any disclaimer, the term of this patent is extended or adjusted under 35 U.S.C. 154(b) by 96 days.

(21) Appl. No.: 10/210,069

(22) Filed: Aug. 2, 2002

(65) Prior Publication Data

US 2003/0110328 A1  Jun. 12, 2003

(30) Foreign Application Priority Data

Dec. 10, 2001 (JP) .............................. 2001-376133

(51) Int. Cl.
*G06F 3/00* (2006.01)

(52) U.S. Cl. .............................. 710/36; 710/2; 710/316; 710/317

(58) Field of Classification Search ............ 710/36–38, 710/316–317
See application file for complete search history.

(56) References Cited

U.S. PATENT DOCUMENTS

| 6,073,188 | A  | * | 6/2000  | Fleming ....................... 710/38 |
| 6,308,239 | B1 | * | 10/2001 | Osakada et al. ............. 710/316 |
| 6,591,309 | B1 | * | 7/2003  | Shah ............................. 710/2 |
| 6,697,905 | B1 | * | 2/2004  | Bealkowski ................ 710/316 |

* cited by examiner

*Primary Examiner*—Kim Huynh
*Assistant Examiner*—Eron J. Sorrell
(74) *Attorney, Agent, or Firm*—Staas & Halsey LLP

(57) ABSTRACT

A computer device with switching function comprises a connector for input/output devices, at least one internal computer, at least one connector for an external computer, and a switching unit for switching connection of the connector for the input/output devices to either one of the internal computer or the connector for the external computer.

21 Claims, 10 Drawing Sheets

COMPUTER AND COMPUTER SYSTEM HAVING SECURITY FEATURES

BACKGROUND OF THE INVENTION

1. Field of the Invention

The present invention relates to an apparatus and a system for sharing input/output devices by switching between a plurality of computers.

2. Description of the Related Art

Along with the remarkable development of processing performance of computers, use of the computers is becoming more widespread. For example, a personal user may often have a plurality of computers each of which has a different environment. In such case, input/output devices such as a keyboard, a display monitor, and a mouse are typically connected to the plurality of computers with the aim of space and cost saving. Such a switching device is usually called a KVM (K: Keyboard, V: Video, and M: Mouse) switch.

The KVM switch is connected between the input/output devices and the plurality of computers and, simultaneously, functions so that connection of the input/output devices to only any one of the plurality of computers can be active. By using the KVM switch, a user can selectively utilize one computer among the plurality of computers.

Further, at present, as the Internet and an intranet to interconnect plural computers in a network have rapidly become widespread, several computer systems for utilizing the KVM switch have also been proposed.

When a computer is used by connecting it to an external network such as the Internet, there may be problems such as data leakage due to an operating error by a user himself, a cracking attempt or inflow of computer viruses from the external network.

Then, for the purpose of improving security, a computer system has been proposed wherein one computer to be connected to the Internet and the other computer to be utilized personally or to be connected to an intranet are placed separately and are connected to the input/output devices via the KVM switch described above. In such computer system, as the Internet and the intranet are totally separated, a user can selectively use the computer for tasks that do not need the Internet connection or tasks that are especially important, and the other computer for using the Internet connection, depending upon the type or the degree of importance of the tasks.

The computer system where one set of input/output devices controls plural computers via the KVM switch has an advantage in terms of installation cost and space requirement, in comparison with a computer system where each computer has respective input/output devices. However, the former still has several problems.

For example, for the purpose of improvement of the user's working environment, or due to constraints of the working environment, when the KVM switch is disposed near the working desk or other space on which the computers or the input/output devices are placed, the KVM switch may occupy the user's working area unnecessarily.

Further, on the other hand, when the KVM switch is placed in a position that is relatively far from the computers and the input/output devices and not visible to the user, such as space under the working desk or behind the computer, the user's working area may be reserved, but a switching operation or the checking of switching status of the KVM switch may be very inconvenient. Further, the cables for connection between the computers and the input/output devices via the KVM switch may be extended in this case, as a result of which the image quality of the display monitor may be inevitably degraded.

Still further, in terms of improvement of security, it may be preferable to use the plurality of independent computers selectively by means of the KVM switch depending upon the type or the degree of importance of the tasks, but when data is transferred from one computer to the other computer in such computer system, it is inconvenient that the data must be stored temporarily on any storage media, which should be inserted manually into the latter computer.

Therefore, in view of the above problems, it is an object of the present invention to provide a computer and a computer system having security features while reserving the user's working space and reducing installation cost when the input/output devices are shared by switching the plurality of computers.

SUMMARY OF THE INVENTION

In order to attain the above object, in the present invention, a computer device with switching function is provided wherein an internal computer and a switching unit are installed inside a case of the computer device, and the switching unit switches connection of input/output devices of the computer device either to a connector for connecting an external computer that is installed outside the case, or to the internal computer.

FIG. 1 is a basic block diagram of the computer device with the switching function according to the present invention.

According to the present invention, the computer device 1 comprises a connector 15 for connecting input/output devices, at least one internal computer 11, at least one connector 13 for an external computer, and a switching unit 12 that is connected between the internal computer 11 and the connector 13 for the external computer and switches connection of the connector 15 for connecting the input/output devices to either one of the internal computer 11 or the connector 13 for the external computer.

Further, the computer device 1 comprises a case 14 for housing at least the internal computer 11 and the switching unit 12.

Alternatively, the internal computer 11 may further comprise a connector 52 for connecting an output device such as a display monitor and the like.

According to the present invention, as the internal computer and the switching unit are installed inside the case of the computer device and the switching unit switches connection of the input/output devices of the computer unit either to the internal computer or to the external computer, a further space and cost saving can be achieved.

BRIEF DESCRIPTION OF THE DRAWINGS

The present invention will be more clearly understood from the description as set below with reference to the accompanying drawings, wherein.

DESCRIPTION OF THE PREFERRED EMBODIMENTS

First, a first embodiment of the present invention will be described. It is to be noted that an example in which only one internal computer and one connector for an external computer are included will be described here for the sake of simplicity.

Figure 1:
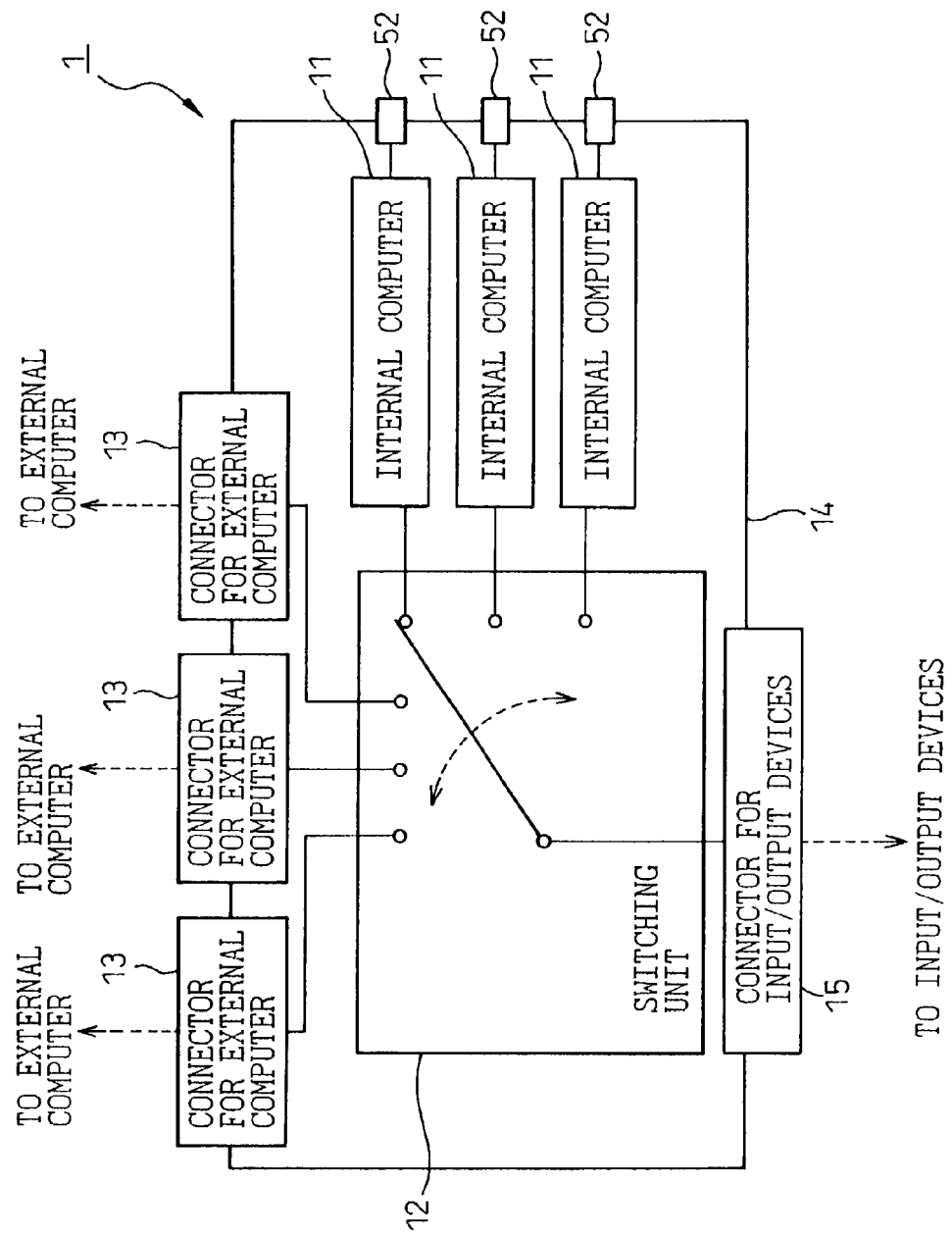
FIG. 1 is a basic block diagram of a computer device with switching function according to the present invention.
Figure 2:
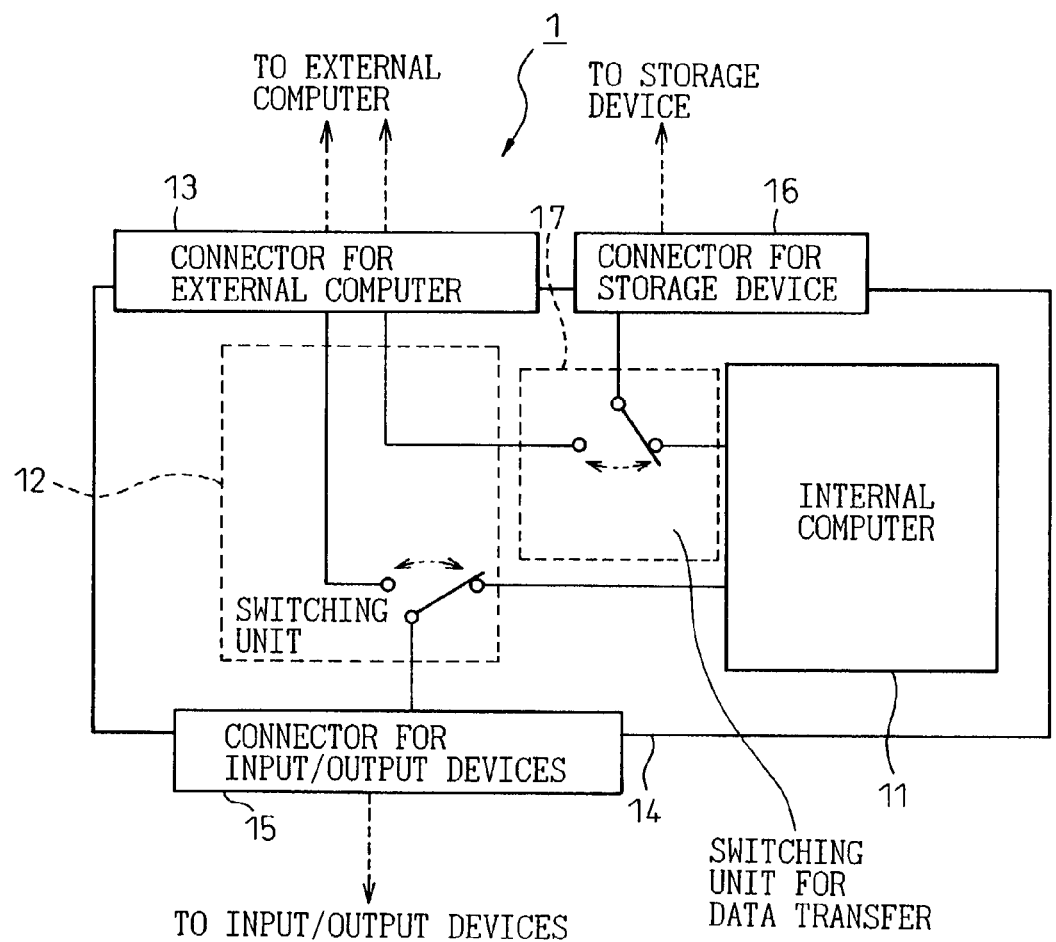
FIG. 2 is a basic block diagram of a computer device with switching function according to a first embodiment of the present invention.

FIG. 2 is a basic block diagram of the computer device with switching function according to the first embodiment of the present invention.

According to the first embodiment of the present invention, the computer device 1 with the switching function comprising a connector 15 for connecting input/output devices further comprises one internal computer 11, a switching unit 12 that is connected to the internal computer 11, and one connector 13 for an external computer that is connected to the internal computer 11 via the switching unit 12. The computer device 1 further comprises a case 14 for housing at least the internal computer 11 and the switching unit 12. The switching unit 12 switches connection of the connector for the connector 15 for connecting the input/output devices to either one of the internal computer 11 or the connector 13 for the external computer.

The computer device 1 with the switching function according to this embodiment further comprises a connector 16 for connecting a storage device, and a switching unit 17 for data transfer that switches connection of the connector 16 for connecting the storage device to either one of the internal computer 11 or the connector 13 for the external computer.

Next, the operating principle of the switching operation according to this embodiment will be described.

When the user executes a specific operation that instructs switching the connection of the input/output devices, the switching unit 12 switches connection of the connector 15 for connecting the input/output devices to either one of the internal computer 11 or the connector 13 for the external computer.

The operating principle of the data exchange between the internal computer 11 and the external computer will be described.

As described above, in a conventional environment wherein a plurality of independent computers are used selectively via the KVM switch depending upon the type or the degree of importance of the tasks, when data is transferred from one computer to the other computer, the data must be stored temporarily on storage media, which should be inserted manually into the latter computer.

In this embodiment, the data exchange can be implemented by connecting the storage device to the computer device 1, storing the data of the one computer on the storage device temporarily, and then transferring the data to the other computer.

Figure 3:
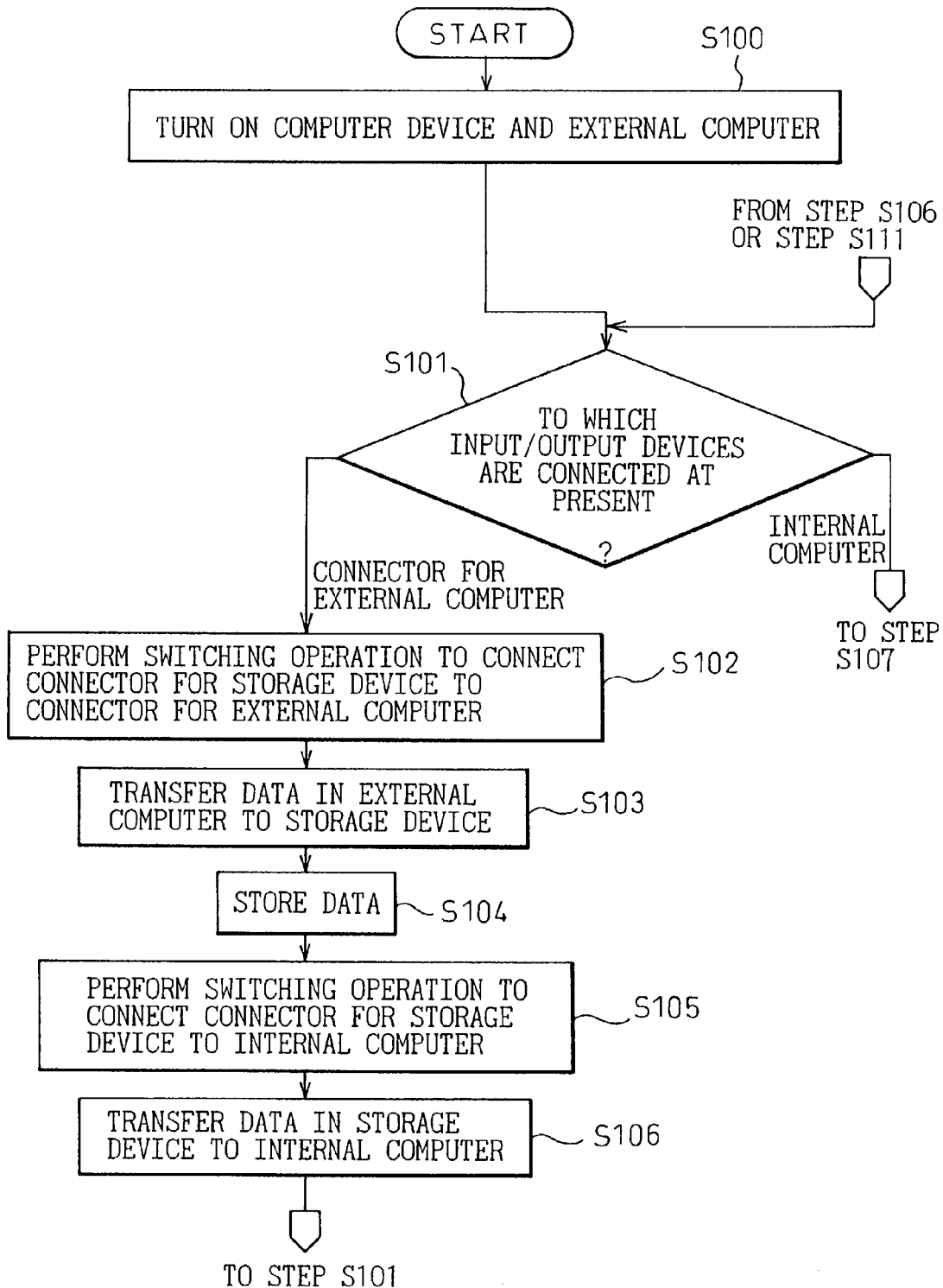
FIGS. 3 and 4 are flow charts describing data exchange process in the computer device with the switching function according to the first embodiment of the present invention.
Figure 4:
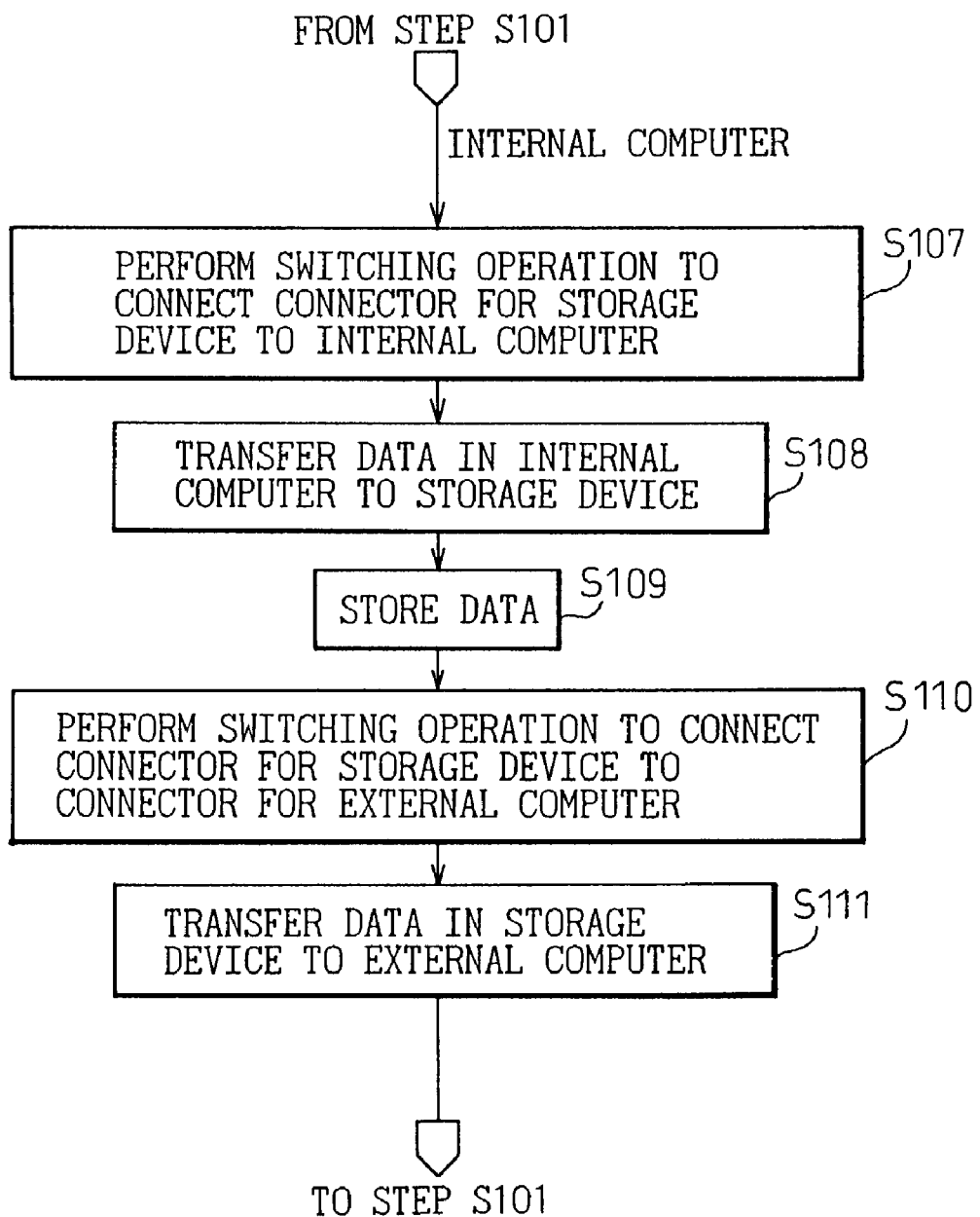

FIGS. 3 and 4 are flow charts describing the data exchange process in the computer device with the switching function according to the first embodiment of the present invention.

In step S100, the computer device with the switching function according to this embodiment and the external computer connected to the computer device are powered on.

When the user instructs to execute the data transfer by a specific operation (for example, by pressing down a specific key on a keyboard), it is determined to which the input/output devices are connected at present in step S101. This determination operation is performed by a microcomputer that is installed in the switching unit 12 and controls the switching status of the switching unit 12. In step S101, if it is determined that the input/output devices are connected to the external computer at present, the process proceeds to step S102, on the other hand, if it is determined that the input/output devices are connected to the internal computer 11, the process proceeds to step S107.

In step S102, the switching unit 17 for data transfer switches connection of the connector 16 for connecting the storage device to the connector 13 for the external computer.

Then, in step S103, desired data that is stored in the external computer is transferred to the storage device via the connector 13 for the external computer, the switching unit 17 for data transfer and the connector 16 for the storage device.

Then, in step S104, the storage device stores the transferred data.

When the data storage process has completed in step S104, in step S105, the switching unit 17 for data transfer switches connection of the connector 16 for storage device to the internal computer 11 from the connector 13 for the external computer.

Then, in step S106, the data that has been stored in the storage device is transferred to the internal computer 11 via the connector 16 for the storage device and the switching unit 17 for data transfer. Through each of the above steps, the data in the external computer can be transferred to the internal computer.

Alternatively, in step S101, if it is determined that the input/output devices are connected to the internal computer 11 at present, the process proceeds to step S107.

In step S107, the switching unit 17 for data transfer switches connection of the connector 16 for the storage device to the internal computer 11.

Then, in step S108, desired data that is stored in the internal computer 11 is transferred to the storage device via the switching unit 17 for data transfer and the connector 16 for the storage device.

Then, in step S109, the storage device stores the transferred data.

When the data storage process has completed in step S109, in step S110, the switching unit 17 for data transfer switches connection of the connector 16 for the storage device to the connector 13 for the external computer from the internal computer 11.

Then, in step S111, the data that has been stored in the storage device is transferred to the external computer via the connector 16 for storage device, the switching unit 17 for data transfer and the connector 13 for the external computer.

Through each of the above steps, the data in the internal computer 11 can be transferred to the external computer.

Thus, in the above description, a block configuration and a basic operational principle of the computer device with switching function according to the first embodiment has been described.

According to this embodiment, though the internal computer 11 in the computer device 1 with the switching function is connected to the connector 13 for the external computer that is, in turn, connected to the computer device 1 via the switching unit 12, the switching unit 12 never connects the connector for the external computer to the internal computer 11 electrically. Thus, the internal computer 11 is entirely independent of the connector 13 for the external computer.

Therefore, problems such as erroneous data transfer between the external computer and the internal computer 11, and any cracking attempt from an external network, and erroneous data leakage or inflow of computer viruses that may occur when the external computer or the internal computer is further connected to the external network, can be avoided, resulting in improvement in security. Further, as the internal computer and the switching unit 12 are installed in the case 14, installation space and cost can be reduced in comparison with a conventional example.

Next, a specific configuration of the computer device with the switching function according to this embodiment will be described.

Figure 5:
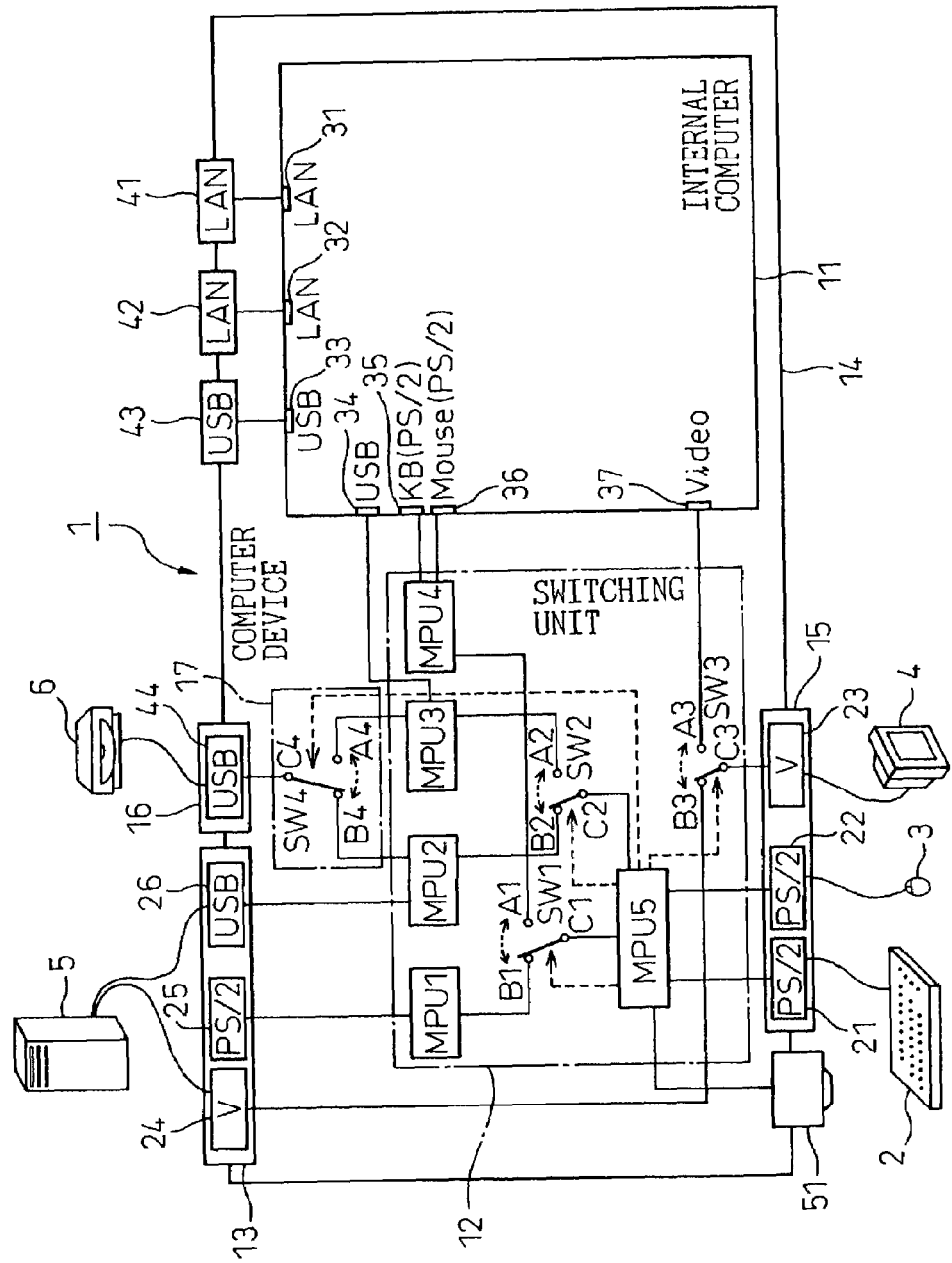
FIG. 5 is a schematic circuit diagram of the computer device with the switching function according to the first embodiment of the present invention.

FIG. 5 is a schematic circuit diagram of the computer device with the switching function according to the first embodiment of the present invention.

In the case 14 of the computer device with the switching function according to this embodiment, the internal computer 11 and the switching unit 12 are installed. The connector 15 for the input/output devices, the connector 13 for the external computer and other connection terminals are disposed on the case 14.

Input devices such as the keyboard 2, the mouse 3 and the display monitor 4 are connected to the computer device 1 according to this embodiment via the connector for the input/output devices. Further, one external computer 5 is connected to the computer device 1 via the connector for the external computer. Still further, the storage device 6 is connected to the connector 16 for the storage device.

The connector 15 for the input/output devices comprises a keyboard terminal 21 for connecting the keyboard 2, a mouse terminal 22 for connecting the mouse 3, and the video (V) terminal 23 for connecting the display monitor 4. Though the keyboard terminal 21 and the mouse terminal 22 shown in this embodiment have a PS/2™ interface, it may alternatively be a USB interface, or the keyboard terminal and the mouse terminal may comprise both interfaces or either one interface.

As an example of the input/output devices, the keyboard 2 may be, for example, a PS/2™ English/Japanese keyboard and the like. Further, the mouse 3 may be a ⅔-button mouse, a wheel mouse, a joystick and other various pointing devices. On the other hand, the display monitor may be of various types such as a VGA, SVGA or multisync monitor. It is to be noted here that the input/output devices that can be connected to the computer device 1 with the switching function are not limited to the above examples, and various other devices may be contemplated and further connection terminals for such devices may be installed, just as in the case of typical computer devices.

The connector 13 for the external computer comprises a video (V) terminal 24 for connecting a video cable from the external computer 5, and a terminal 25 and a terminal 26 for connecting cables to transmit and receive a keyboard signal and a mouse signal from the external computer 5. Here, the terminal 25 may be a PS/2™ and the terminal 26 may be a USB interface so that the external computer 5 can be connected to either interface. Here, it is to be noted that the terminals 25 and 26 may alternatively comprise only one interface.

The connector 16 for the storage device comprises a USB terminal 44 to connect to a terminal C4 of a switching element SW4 described later. Storage devices to be connected to the connector 16 for the storage device may be any drive unit such as CD-RW, DVD-RW, MO, Zip™ or floppy disk drive and the like.

The internal computer as stated herein means a part having features to execute the operation that is inherent in computers, which does not include external peripheral devices such as a printer. The internal computer 11 executes operations for applications such as a word processor and various communication utilities, for example. In this embodiment, the internal computer 11 comprises LAN ports 31 and 32, USB ports 33 and 34, a keyboard (KB) connection port 35, a mouse connection port 36, and a video port 37.

The LAN ports 31 and 32 and the USB port 33 are connected to the connection terminal 41, 42, 43 disposed on the case 14 and can be connected to external networks such as the Internet or an intranet, or various external devices such as a printer, a scanner and the like. Here, it is to be noted that the type of the connection terminals and the number of the ports may be configured arbitrarily depending upon a use environment, system design and the like.

The switching unit 12 in FIG. 5 comprises microcomputers MPU1, MPU2, MPU3, MPU4 and MPU5, switching elements SW1, SW2 and SW3. The switching elements SW1, SW2 and SW3 are comprised of an electronic switch such as a solid-state switch, for example. In effect, it is advantageous to configure each component including these microcomputers and switching elements in a one-chip microcomputer. In such case, switching operation of the above switching elements SW1, SW2 and SW3 may be implemented as port switching operation in the one-chip microcomputer.

Here, it is to be noted that the switching unit 17 for data transfer comprises the switching element SW4.

The microcomputer MPU1 is connected between the PS/2™ connection terminal 25 of the connector 13 for the external computer and the terminal B1 of the switching element SW1.

The microcomputer MPU2 is connected between the USB connection terminal 26 of the connector 13 for the external computer and the terminal B2 of the switching element SW2. Further, the microcomputer MPU2 is also connected to the terminal B4 of the switching element SW4.

The microcomputer MPU3 is connected between the USB port 34 of the internal computer 11 and the terminal A2 of the switching element SW2. Further, the microcomputer MPU3 is also connected to the terminal A4 of the switching element SW4.

The microcomputer MPU4 is connected between the keyboard (KB) connection port 35 as well as the mouse connection port 36 of the internal computer 11 and the terminal A1 of the switching element SW1.

The microcomputer MPU5 is connected between the keyboard terminal 21 as well as the mouse terminal 22 of the connector 15 for the input/output devices and the terminals C1 and C2 of the switching elements SW1 and SW2, respectively.

The switching element SW3 is a video switch that has a terminal B3 connected to the video terminal 24 of the connector 13 for the external computer, a terminal A3 connected to the video port 37 of the internal computer 11, and a terminal C3 connected to the video terminal 23 of the connector 15 for the input/output devices.

On the case 14 of the computer device 1 with the switching function, a switch 51 for switching operation is installed that switches connection of the input/output devices consisting of the keyboard 2, the mouse 3 and the display monitor 4 to either one of the internal computer 11 or the external computer 5. Here, as mentioned below, it is preferable that this switching operation can be controlled not only by the switch 51 for the switching operation but also by a specific key manipulation (for example, by pressing down the control key two times continuously) or by a specific manipulation of the mouse 3.

Next, function of each component in the computer device 1 with the switching function according to this embodiment will be described.

Typically, when the PS/2™ keyboard and mouse are connected to a computer, if the keyboard or mouse is removed from the computer in operation, such computer will boot-up. In the case of the computer connected to the KVM switch, the switching operation of the KVM switch equates to removal of the keyboard or mouse. Therefore, in order to prevent the boot-up of the computer when the keyboard or mouse is isolated by the switching operation of the KVM switch, the KVM switch having electronic switching elements typically sends a virtual signal for emulating the keyboard and mouse to the computer from which the keyboard or mouse is isolated. It allows the keyboard and mouse to be seen from the computer as if the keyboard and mouse were connected continuously.

The microcomputers MPU1, MPU2, MPU3 and MPU4 in this embodiment are intended to output the virtual signal. The microcomputers MPU1 and MPU2 can output the virtual signal to the external computer that is connected via the connector 13 for the external computer, while the microcomputer MPU3 and MPU4 can output the virtual signal to the internal computer 11. Further, the microcomputers MPU2 and MPU3 can also output the virtual signal to the storage device that is connected via the connector 44 for the storage device.

The switching elements SW1 and SW2 switch connection of the keyboard 2 and the mouse 3 to either one of the internal computer 11 or the external computer 5, while the switching element SW3 switches connection of the display monitor to either one of the internal computer 11 or the external computer 5. The switching elements SW1, SW2 and SW3 perform the switching operation in an interlocking manner.

The switching element SW4 switches connection of the storage device 6 to either one of the internal computer 11 or the external computer 5.

The microcomputer MPU5 controls the switching operation of the switching elements SW1, SW2, SW3 and SW4. When the user performs a specific operation to instruct switching of the input/output devices such as manipulation of the switch 51, key manipulation on the keyboard 2, or a specific click action of the mouse 3, the microcomputer MPU5 outputs a control signal to instruct switching operation to the switching elements SW1, SW2 and SW3.

Figure 6:
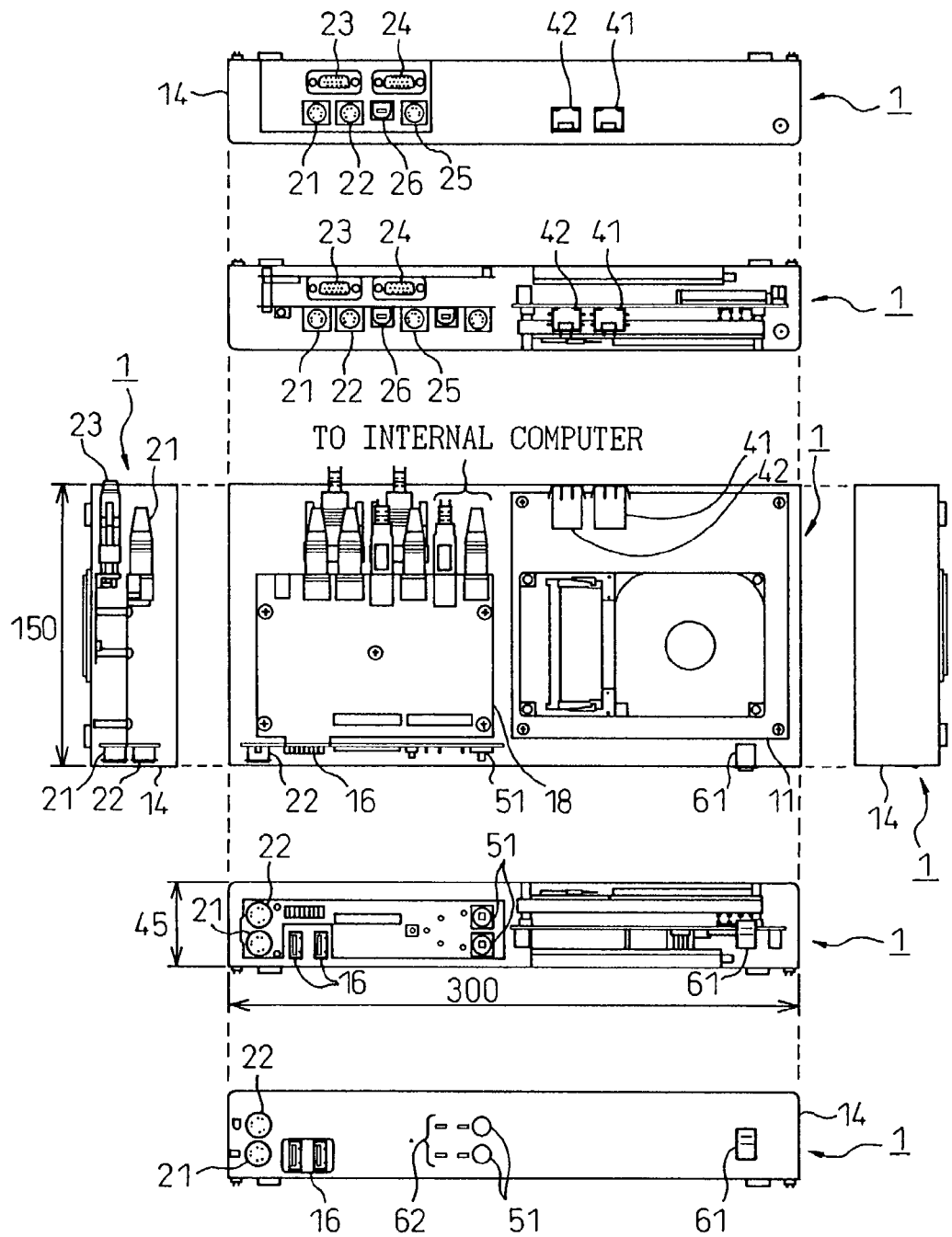
FIG. 6 is a diagram illustrating an outer appearance of the computer device with the switching function according to the first embodiment of the present invention.

FIG. 6 is a diagram illustrating an outer appearance of the computer device with the switching function according to the first embodiment of the present invention, each shows a rear elevation view, the rear elevation view with illustration of the internal structure, a top view with illustration of the internal structure, a front elevation view with illustration of the internal structure, the front elevation view without illustration of the internal structure, a left side view with illustration of the internal structure, and a right side view without illustration of the internal structure. Here, it is to be noted that the example of an arrangement in FIG. 6 is shown for illustrative purpose only, and that the illustrated location and the number of each component is not intended to limit the present invention and thus may be altered appropriately according to a specific design.

In this embodiment, as shown in FIG. 6, the internal computer 11, and a KVM module 18 including the switching unit 12 shown in FIG. 5 and the switching unit 17 for data transfer are disposed inside the case 14.

Further, as shown in FIG. 6, on the front side of the computer device 1, the keyboard terminal 21, the mouse terminal 22, the connector 16 for the storage device, and the switch 51 for the switching operation are disposed.

The switch 51 for switching operation comprises one push-button switch for switching to the internal computer, and the other push-button switch for switching to the external computer. Here, in this embodiment, since the switching operation of the input/output devices is performed between the internal computer and one external computer only, the switch 51 for switching operation may alternatively be comprised of only one push-button switch that can perform switching operation of the input/output devices between the internal computer and the external computer alternately by pressing down (toggling) the button.

On the front side of the computer device 1, a power switch 61 and an indicator unit 62 that displays to which device the input/output devices are connected by means of indicator lamps are further disposed. The indicator unit 62 may be composed of LEDs, a liquid crystal display or other lamps and the like. Here, it is to be noted that the indication about the device to which the input/output devices are connected may alternatively be displayed on the screen of the display monitor.

Further, as shown in FIG. 6, on the rear side of the computer device 1, the keyboard terminal 21, the mouse terminal 22, the video terminal 23 for the input/output devices, the video terminal 24 for connecting a video cable from the external computer 5, the USB terminal 26 and the PS/2™ terminal 25 for connecting a cable to transmit and receive the keyboard signal and the mouse signal from the external computer 5, and the LAN ports 41 and 42. Here, it is to be noted that the keyboard terminal 21, the mouse terminal 22, and the video terminal 23 are disposed on the front side of the computer device 1, too, which are wired inside the case 14 correspondingly to each terminal disposed on the rear side. It allows the keyboard, the mouse and the display monitor to be wired to the computer device 1 from both the front and the rear sides more easily.

Thus, the computer device with the switching function of the present invention may have an appearance not so different from the one of typical computer devices and it may not occupy larger installation space. Further, when the external computer is not connected, it can be used as a typical computer device.

As described above, according to the computer device of this embodiment, when a plurality of computers are utilized by a set of input/output devices via a KVM switch, for example, space requirement and cost can be reduced.

Further, as the internal computer is entirely independent of the connector for the external computer, problems such as erroneous data transfer between the external computer and the internal computer, and any cracking attempt from an external network, and erroneous data leakage or inflow of computer viruses that may occur when the external computer or the internal computer is further connected to the external network, can be avoided, resulting in an improvement in security.

Here, in this embodiment, though the computer device comprising one internal computer and one connector for the external computer is described, the computer device may alternatively comprise two or more internal computers and two or more connectors for the external computer. In such case, switching elements and microcomputers for generating a virtual signal that correspond to each of the internal computers and the connectors for the external computer may be installed. Alternatively, the computer device of this embodiment may be used alone without connecting the external computer to the connector for the external connector, in this case the computer device of this embodiment acts as a typical computer device.

Still further, a terminal for connecting a storage device for data exchange between the external computer and the internal computer may further be installed to facilitate data transfer operation.

Figure 7:
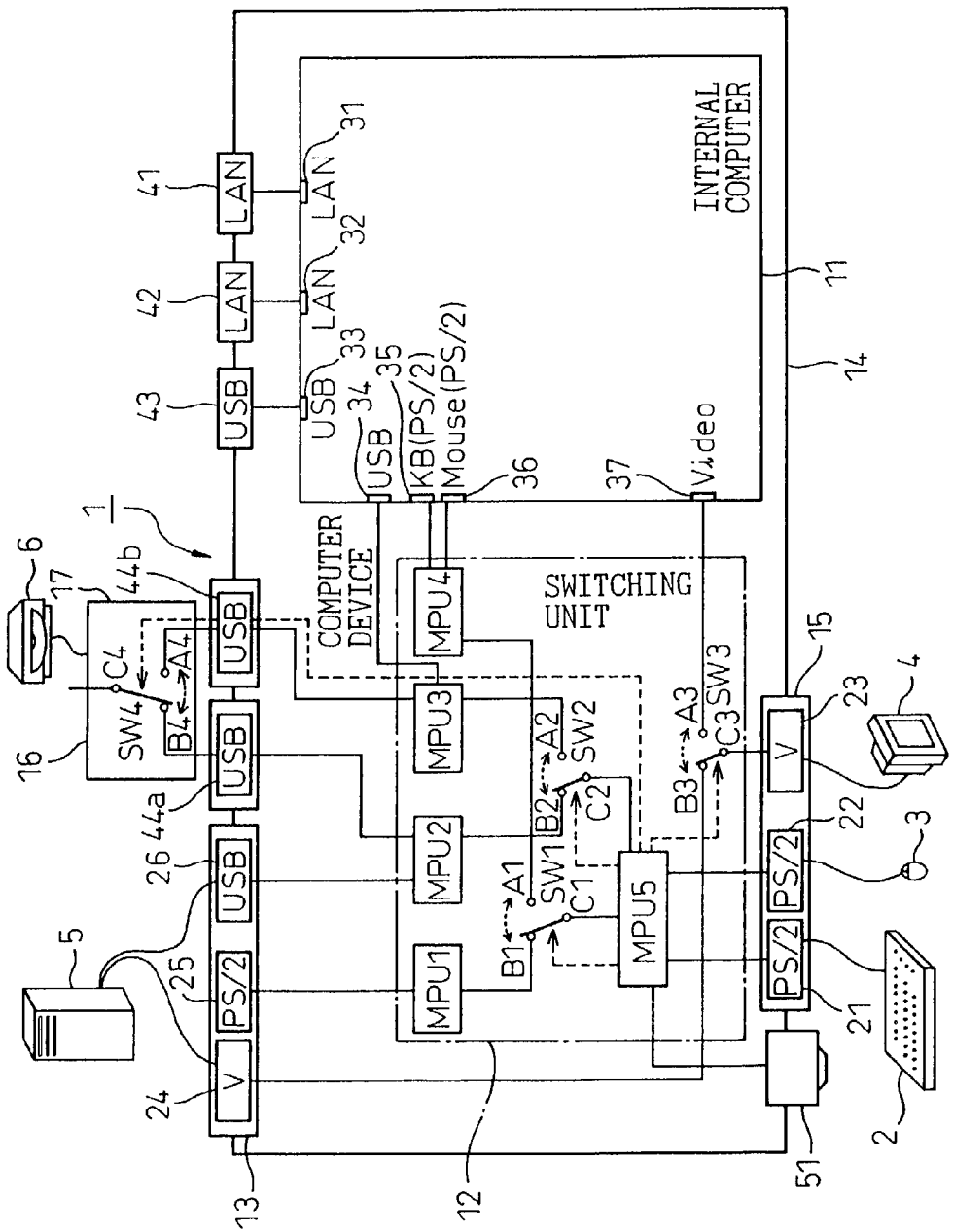
FIG. 7 is a circuit block diagram of the computer device with the switching function according to the first embodiment of the present invention.

Here, in this embodiment, though the switching unit for data transfer is installed inside the case of the computer device, it may alternatively be installed outside the case. FIG. 7 is a circuit block diagram of the computer device with the switching function according to a variation of the first embodiment of the present invention. In this variation, the switching unit 17 for data transfer is installed outside the case 14 as a separate unit of the computer device 1, and USB connectors 44a and 44b for connecting the switching unit 17 for data transfer to the computer device 1 are installed on the case 14. Here, a control signal for switching operation of the switch element SW4 in the switching unit for data transfer may be transmitted either via the USB connector 44a or via the USB connector 44b.

Next, a second embodiment of the present invention will be described. A computer device with switching function according to this embodiment comprises a plurality of internal computers inside a case, and further comprises display monitors corresponding to each of the internal computers.

Figure 8:
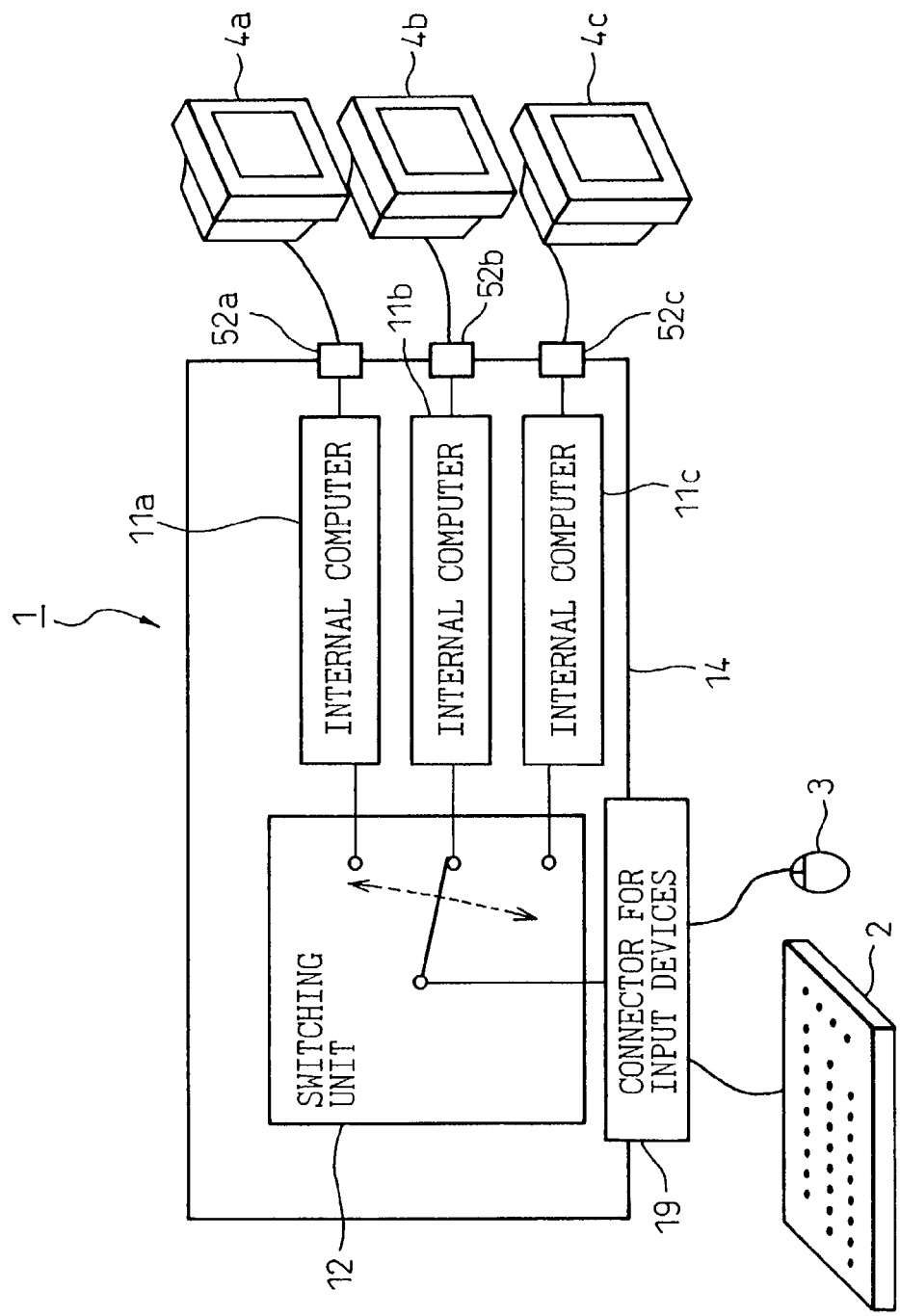
FIG. 8 is a block diagram of the computer device with the switching function according to a second embodiment of the present invention.

FIG. 8 is a block diagram of the computer device with the switching function according to the second embodiment of the present invention.

In this embodiment, a computer device 1 with switching function comprising a connector 19 for connecting input/output devices comprises three internal computers 11a, 11b and 11c, and a switching unit 12 for switching connection of the connector 19 for the input/output devices to either one of the internal computer 11a, 11b and 11c. The computer device 1 further comprises a case 14 for housing at least the internal computers 11a, 11b and 11c and the switching unit 12.

Further, each of the internal computers 11a, 11b and 11c comprises respective one of connectors 52a, 52b and 52c for installing respective one of display monitors 4a, 4b and 4c. Here, it is to be noted that the computer device of this embodiment does not have an connector for connecting the external computer described in the first embodiment, as the external computer is not connected to the computer device of this embodiment. Further, in this embodiment, though the computer device comprising three internal computers inside the case 14 is described, the computer device may alternatively comprise a different number of internal computers.

This embodiment is especially effective for a system for operating a plurality of computers and display monitors by a set of input/output devices such as a dealing system that is particularly utilized for financial trading and the like. Thus, according to this embodiment, the plurality of computers described above are housed in the case as internal computers, and as a consequence, an installation space requirement and an installation cost can be reduced.

It is to be noted that the first and second embodiments described above can also be applicable to a computer device like a notebook personal computer, wherein input/output devices such as a keyboard, a pointing device and a display monitor are installed integrally in a main body of the computer device. In such case, a block having computer features in the notebook personal computer is considered as the internal computer as described above, and the switching unit is housed in the case of the notebook personal computer. In this case, portability can be improved and, at the same time, image degradation of the display monitor can be eliminated since a monitor cable that is otherwise needed to connect the display monitor externally becomes unnecessary.

Figure 9:
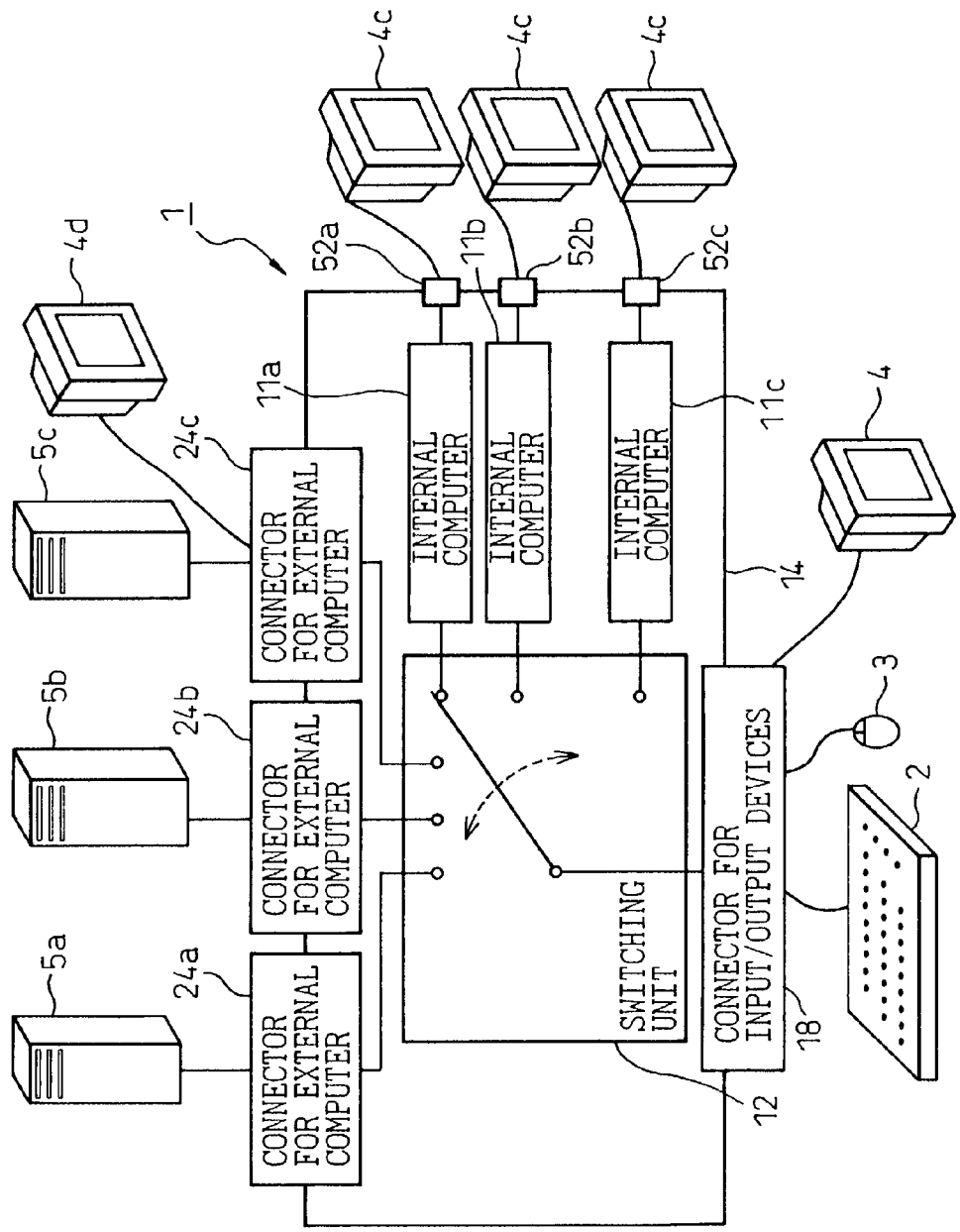
FIG. 9 is a block diagram of the computer device with the switching function according to a third embodiment of the present invention which is combination of the first and second embodiments.

Further, the first and second embodiments may alternatively be implemented in combination. FIG. 9 is a block diagram showing a computer device with switching function in a third embodiment that is a combination of the first and second embodiments in the present invention.

According to this embodiment, the computer device 1 comprises three internal computers 11a, 11b and 11c inside a case 14, and three external computers 5a, 5b and 5c are connected to the computer device. Other configuration and operating principle are similar to the embodiments described above, and thus are not described further. Further, the description of the connector for the storage device for data transfer is also omitted.

Further, it is to be noted that, in the computer device 1 of FIG. 9, a display monitor 4d that is dedicated for the external computer 5c, so that the display monitor 4d can operate instead of the display monitor 4 when the keyboard 2 and the mouse 3 are connected to the external computer 5c, for example. In this case, the operation of the display monitor 4 may be disabled while the display monitor 4d is operating.

The computer device with the switching function according to the present invention is particularly effective in the case where one computer connected to the Internet and another computer utilized personally or connected to an intranet are installed independently, wherein working space for the user can be reserved, installation cost can be reduced, and a computer system having security features can be implemented.

Figure 10:
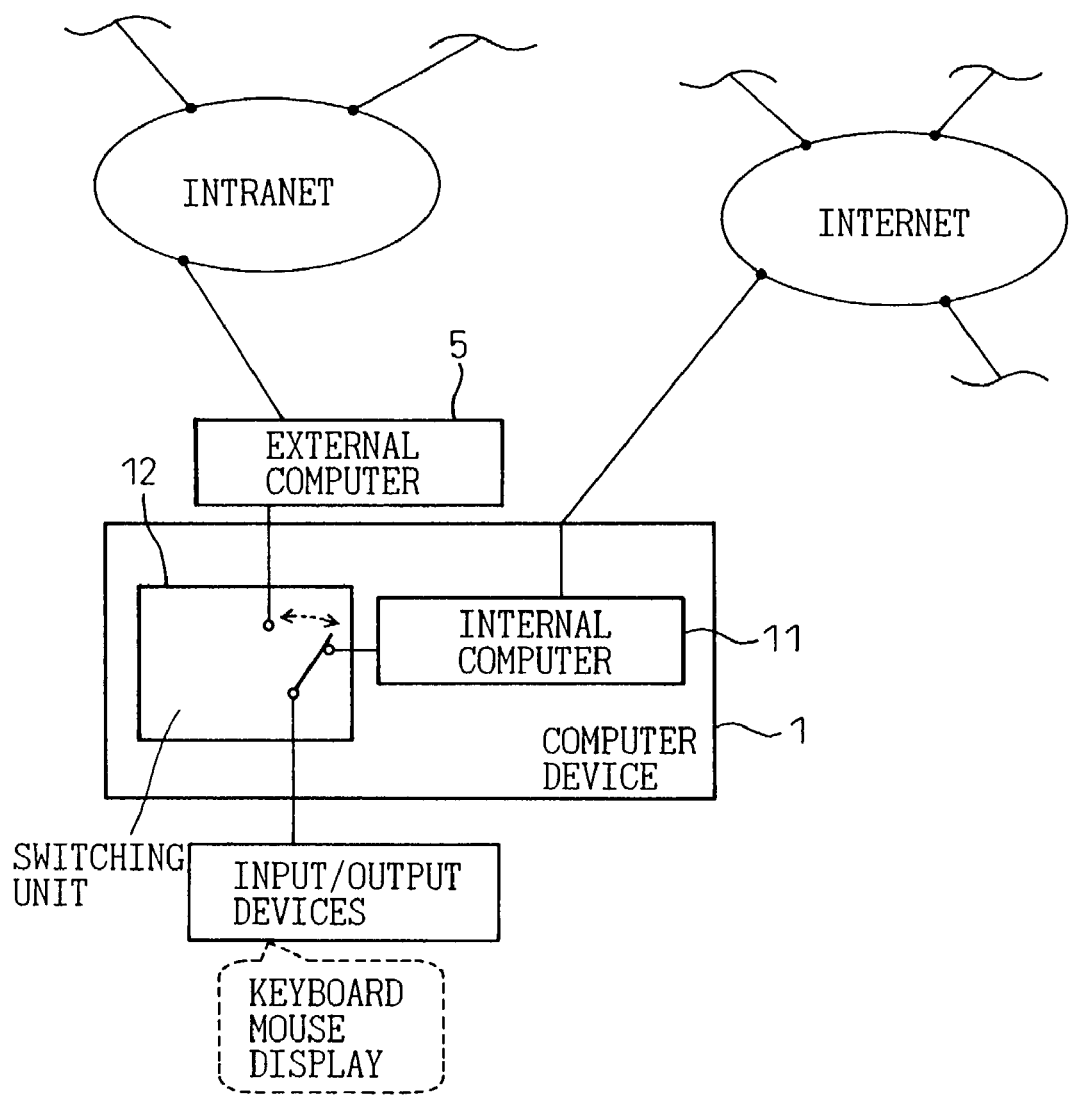
FIG. 10 is a conceptual view illustrating a computer system including the computer device with the switching function according to the present invention.

FIG. 10 is a conceptual view illustrating a computer system including the computer device with the switching function according to the present invention.

For example, in FIG. 5 described above, by connecting the connection terminal 41 which is in turn connected to the LAN port 31 of the computer device 1 to the Internet and connecting the external computer 5 to an intranet, the computer system as shown in FIG. 10 can be obtained. By means of such computer system, it is possible to use selectively the Internet and the intranet in an entirely separate manner, whereby security can be improved, and moreover installation space requirement and installation cost can be reduced in comparison to a conventional system. Here, it is to be noted that similar effects may also be obtained by connecting the connection terminal 41 which is in turn connected to the LAN port 31 of the computer device 1 to the Intranet, and connecting the external computer 5 to the Internet.

As described above, according to the first embodiment of the present invention, since the internal computer and the switching unit are installed inside the case of the computer device and the switching unit can switch connection of the input/output devices of the computer device to either one of the internal computer or the external computer, space requirement and cost can be saved when a plurality of computers are utilized by a set of the input/output devices via the KVM switch, for example.

Further, since the internal computer is entirely independent of the connector for the external computer, problems such as erroneous data transfer between the external computer and the internal computer, and any cracking attempt from an external network, and erroneous data leakage or inflow of computer viruses that may occur when the external computer or the internal computer is further connected to the external network, can be avoided, resulting in improvement of security.

Still further, data transfer operation can be facilitated by installing the terminal to connect the storage device for data transfer between the external computer and the internal computer.

Still further, as the internal computer and the switching unit are installed inside the case so that wiring between these components can be shortened, image degradation of the display monitor can be avoided.

Still further, the switching operation can be executed easily through manipulation of the switch installed on the case of the computer device, the keyboard or the mouse, on the other hand, it is easy to check to which device the input/output devices are connected since such information is indicated by means of the indicator unit 62 or displayed on the screen of the display monitor.

The second embodiment of the present invention is particularly effective for the system for operating a plurality of computers and display monitors by a set of input/output devices such as a dealing system that is utilized for financial trading. Thus, as the plurality of computers are installed inside the case as the internal computers, installation space requirement and installation cost can be reduced in comparison to conventional systems.

Further, it is to be noted that the first and second embodiments can also be applicable to a computer device like a notebook personal computer, wherein the input/output devices such as the keyboard, the pointing device and the display monitor are installed in a main body of the computer device integrally. In this case, the configuration wherein the switching unit described above is included inside the case of the notebook personal computer is implemented. In this case, the computer device that has better portability and no image degradation of the display monitor can be provided as a monitor cable that is otherwise needed to connect the display monitor externally becomes unnecessary.

Still further, each of the effects described above can be obtained by combining the first and second embodiments of the present invention.

Still further, the computer system including the computer device with the switching function according to the present invention is particularly effective in the case where one computer connected to the Internet and the other computer utilized personally or connected to an intranet are installed and used independently, wherein a working space for the user can be reserved, an installation cost can be reduced, and a computer system having security features can be implemented.

What is claimed is:

1. A computer device with switching function, comprising:
    a connector for external network and/or for external computer readable media input/output type devices;
    at least one internal computer;
    at least one connector for an external computer;
    a switching unit connected between said internal computer and said connector for the external computer, wherein the switching unit comprises a keyboard-video-mouse (KVM) switch to switch connection of KVM input/output devices to either one of said internal computer or said connector for the external computer and a data transfer switch to switch connection of said connector for external network and/or for external computer readable media input/output devices to either one of one of said internal computer or said connector for the external computer; and
    a case for housing said connector for external network and/or for external computer readable media input/output type devices, said at least one internal computer, said at least one connector for the external computer, and said switching unit.

2. A computer device with switching function according to claim 1, wherein the case houses at least said at least one internal computer and said switching unit.

3. A computer device with switching function according to claim 2, further comprising a LAN port that is connected to said internal computer.

4. A computer device with switching function according to claim 1, further comprising a LAN port that is connected to said internal computer.

5. A computer device with switching function according to claim 1, further comprising a LAN port that is connected to said internal computer.

6. A computer device with switching function, comprising:
    a connector for external network and/or for external computer readable media input/output type devices;
    a plurality of internal computers;
    at least one connector for an external computer;
    a switching unit comprising a keyboard-video-mouse (KVM) switch to switch connection of KVM input devices to either one of said plurality of internal computers and a data transfer switch to switch connection of said connector for external network and/or for external computer readable media input/output devices to either one of said internal computers or said connector for the external computer; and
    a case for housing said connector for external network and/or for external computer readable media input/output type devices, said plurality of internal computers, and said switching unit.

7. A computer device with switching function according to claim 6, wherein the case houses at least said plurality of internal computers and said switching unit.

8. A computer device with switching function according to claim 6, further comprising a LAN port that is connected to said internal computer.

9. A computer system comprising:
    a computer device with switching function, comprising:
        a connector for external network and/or for external computer readable media input/output type devices;
        at least one internal computer;

at least one connector for an external computer;

a switching unit connected between said internal computer and said connector for the external computer, wherein the switching unit comprises a keyboard-video-mouse (KVM) switch to switch connection of KVM input/output devices to either one of said internal computer or said connector for the external computer and a data transfer switch to switch connection of said connector for external network and/or for external computer readable media input/output devices to either one of said internal computer or said connector for the external computer; and a case for housing said connector for external network and/or for external computer readable media input/output type devices, said at least one internal computer, said at least one connector for the external computer, and said switching unit, wherein at least one external computer connects to said connector for the external computer of said computer device with the switching function.

10. A computer system according to claim 9, wherein the case houses at least said at least one internal computer and said switching unit between said at least one internal computer and said connector for the external computer.

11. A computer system according to claim 10, further comprising a storage device for connecting to said connector for the external network and/or external computer readable media input/output type devices.

12. A computer system according to claim 10, wherein said computer device with switching function further comprises a LAN port for connecting to said internal computer.

13. A computer system according to claim 9, further comprising a storage device for connecting to said connector for the external network and/or external computer readable media input/output type devices.

14. A computer system according to claim 13, wherein said computer device with switching function further comprises a LAN port for connecting to said internal computer.

15. A computer system according to claim 9, wherein said computer device with switching function further comprises a LAN port for connecting to said internal computer.

16. A computer system according to claim 9, further comprising a storage device for connecting to said connector for the external network and/or external computer readable media input/output type devices.

17. A computer system according to claim 16, wherein said computer device with switching function further comprises a LAN port for connecting to said internal computer.

18. A computer system comprising:

a computer device with switching function, comprising:

a connector for input/output devices;

at least one internal computer;

at least one connector for an external computer;

a switching unit connected between said internal computer and said connector for the external computer, wherein the switching unit switches connection of said connector for the input/output devices to either one of said internal computer or said connector for the external computer;

a connector for an external storage device;

a switching unit for data transfer that switches connection of said connector for the external storage device to either one of said internal computer or said connector for the external computer; and a case for housing said connector for input/output devices, said at least one internal computer, said at least one connector for the external computer, said switching unit between said at least one internal computer and said connector for the external computer, and said switching unit for the data transfer, wherein the input/output devices connect to said connector for the input/output devices of said computer device with the switching function, and wherein at least one external computer connects to said connector for the external computer of said computer device with the switching function to communicably connect to the external storage device.

19. A computer system according to claim 18, wherein the case houses at least said at least one internal computer and said switching unit.

20. A computer system according to claim 18, further comprising a storage device for connecting to said connector for the external storage device.

21. A computer system according to claim 18, wherein said computer device with switching function further comprises a LAN port for connecting to said internal computer.

* * * * *